Aug. 15, 1933.  H. A. DOUGLAS  1,922,234
SWITCHING MECHANISM FOR AUTOMOTIVE VEHICLES
Filed Jan. 25, 1930    2 Sheets-Sheet 1
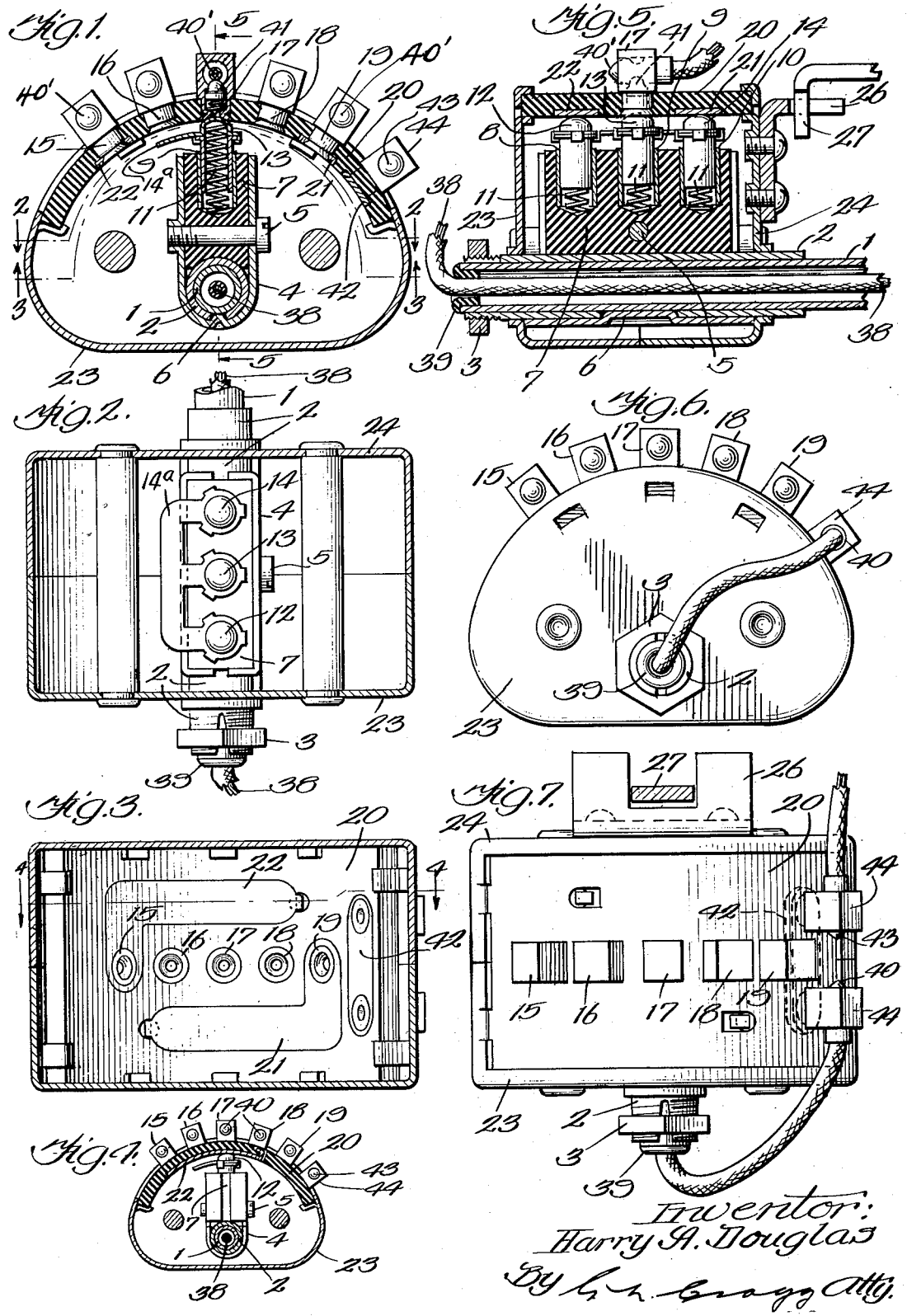
Inventor:
Harry A. Douglas

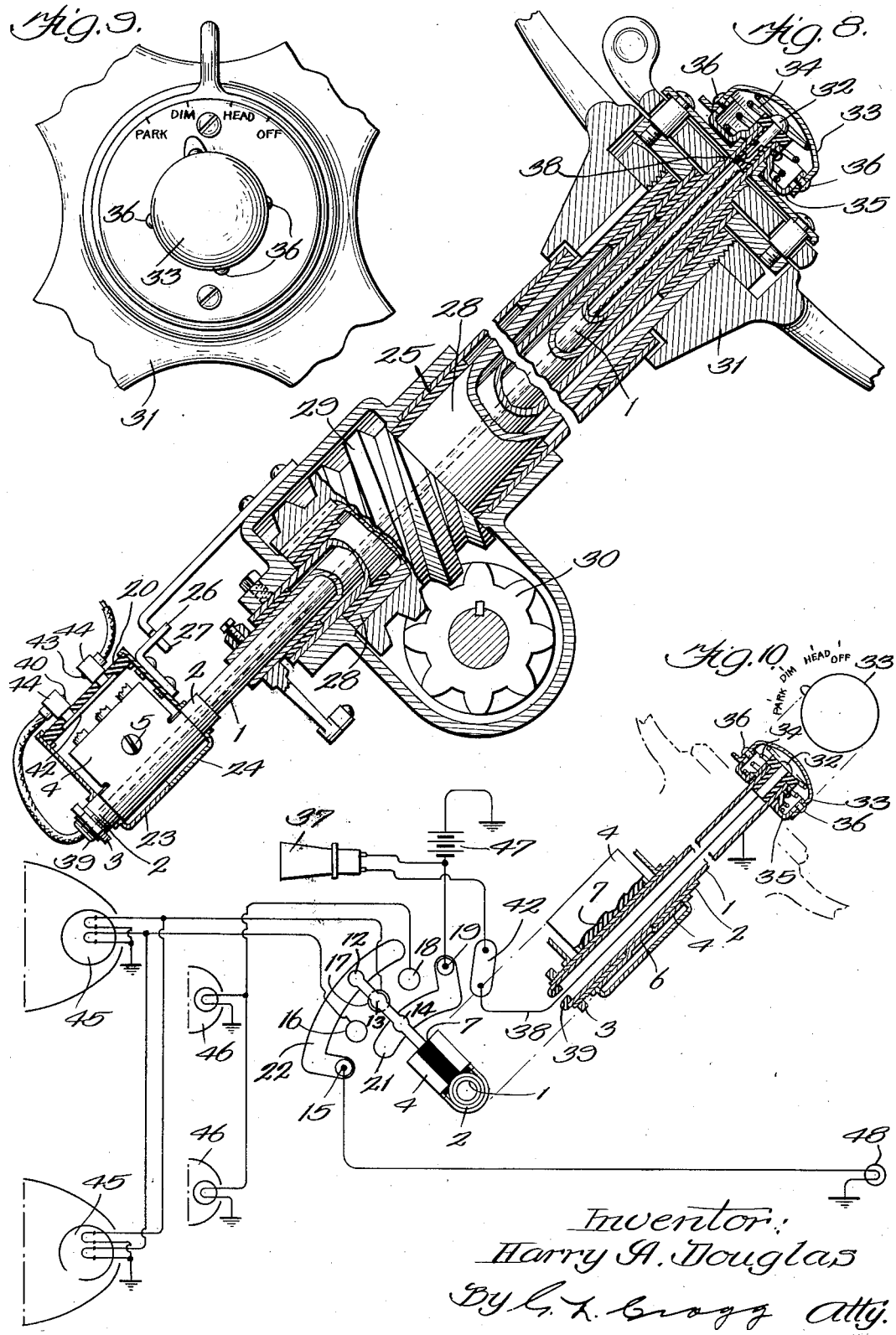

Patented Aug. 15, 1933

1,922,234

UNITED STATES PATENT OFFICE 1,922,234

SWITCHING MECHANISM FOR AUTOMOTIVE VEHICLES

Harry A. Douglas, Bronson, Mich.

Application January 25, 1930. Serial No. 423,413

4 Claims. (Cl. 200—8)

My invention relates to automotive vehicles and electrical circuits associated therewith. In carrying out my invention I assemble the switching mechanism controlling the circuits of an automotive vehicle with the lower end of the stationary steering column and in a position to be free from access of foreign matter, I provide a casing for the switching mechanism, this casing being located upon the upper side of the steering column axis and the upper side of a switch operating shaft that passes through the steering column and steering shaft. This casing is desirably inclusive of an arcuate contact carrying wall portion which is coaxial with the switch operating shaft that carries the contact or contacts that are complementary to contacts upon this wall portion. The switch operating shaft is desirably hollow in which case the circuit of the electromagnetic horn is inclusive of a conductor passing through this shaft into the region of the push button at the hand operated steering wheel. This horn circuit conductor passes through the switch casing and terminates in a circuit connector contact which is complemental to a contact mounted upon the casing to be accessible at the exterior of the casing. The switch casing is mounted on the upper side of the column axis so as to relieve the interior thereof from the accumulation of foreign matter. The push button which operates the horn may also be employed to turn the switch actuating shaft to control the lighting circuits.

The invention will be more fully explained in connection with the accompanying drawings in which Fig. 1 is a cross sectional view illustrating the preferred form of switching mechanism; Fig. 2 is a sectional view on line 2—2 of Fig. 1; Fig. 3 is a sectional view on line 3—3 of Fig. 1; Fig. 4 is a sectional view on line 4—4 of Fig. 3, on a smaller scale; Fig. 5 is a sectional view on line 5—5 of Fig. 1; Fig. 6 is an end view taken from the lower end of the switch casing; Fig. 7 is a top view of the structure in the region of the switching mechanism; Fig. 8 is a longitudinal sectional view taken throughout the length of the steering column with a portion of a column and contiguous parts broken away for lack of space, some parts being shown in elevation; Fig. 9 is an end view taken in the region of the hand operated steering wheel; and Fig. 10 is a diagrammatic illustration of one circuit arrangement.

The switch operating mechanism illustrated is inclusive of a rotatable hollow inclined switch actuating shaft 1 which passes through a sleeve 2 which is fixed thereupon by means of a clamping nut 3 which is screwed upon the left hand and tapered and longitudinally split end of the sleeve 2. A contact actuating U shaped clip 4 embraces the sleeve. A clamping screw 5 is passed through the sides of the clip and is screw threaded into the side of the clip that is remote from the head of the screw, whereby the clip is gripped upon the sleeve to be turned therewith as the shaft 1 is turned. The base of the clip is desirably formed with a key 6 which enters an opening formed through the sleeve 2, whereby rotation of the clip is further assured when the sleeve 2 and shaft 1 are turned. An insulating contact carrying block 7 is clamped between the sides of the clip 4 by the screw 5. The position of this block is further assured by causing the screw to pass through the block and also by forming an arcuate face in the bottom of the block which conforms in curvature to and receives the sleeve 2. This block carries a series of spring barrels 8, 9 and 10 which are distributed along the sleeve 2 and shaft 1 in the same plane and which are radial with respect to said sleeve and shaft. Coiled springs 11 are disposed in said spring barrels and enter the cylindrical continuations of contacts 12, 13 and 14 of the switching mechanism, these contacts being electrically connected together by the metallic current conducting bridge 14a. These springs press these contacts radially outward and against the contacts 15, 16, 17, 18 and 19 or directly against the arcuate casing wall 20 which carries the latter contacts these contacts being countersunk to be flush with the wall 20. The contacts 15, 16, 17, 18 and 19 are all engageable by the contact 13, being arranged in a plane transverse to the axis of the sleeve 2 and shaft 1. The contacts 15 and 19 are provided with continuations 21 and 22 which are positioned to be engageable by the contacts 14 and 12, respectively. The arcuate switch casing wall 20 is fixedly assembled with and between the switch casing walls 23 and 24 against the inner faces of which the bottom of the U shaped clip 4 is snugly received. Such clip thus serves, through the intermediation of the key 6 thereon, to hold the switch casing in assembly with the shaft 1 and, in the embodiment of the invention illustrated, to prevent relative movement of the switch casing and this shaft longitudinally of the shaft. Rotary movement of the casing with respect to the inclined steering column 25 is prevented by means of the U-shaped bracket 26 upon the casing and a tongue 27 received between the sides of such bracket 26, this tongue being carried by the steering column.

The switch operating shaft 1 passes through the interior of a hollow steering shaft 28. This steering shaft carries a worm 29 which is in mesh with a wheel 30 that is in controlling relation with the front steering vehicle wheels, in the case of land vehicles or other steering mechanism in the case of other vehicles. The hollow steering shaft 28 carries a hand operated steering wheel 31 at its upper end. The switch actuating shaft 1 passes through the steering shaft 28 and beyond the upper end of the steering shaft and above the steering wheel 31. A horn circuit contact 32 is mounted in the upper end of the shaft 1 and is insulated therefrom. A grounded metallic horn button 33 is engageable with the contact 32 upon depression of the button. A coiled spring 34 normally maintains the button away from said contact. A skirted coupling member 35 is fixed upon the upper end of the shaft 1. The skirt of the button carries pins 36 which enter slots formed in said coupling member, these slots permitting the button to be depressed lengthwise of the shaft 1 and enabling, in conjunction with said pins, the button to turn this shaft when the button is turned. The button may thus be depressed when the shaft is turned to any position for the purpose of sounding the electromagnetic horn 37. The circuit of the horn includes a conductor 38 which passes through the shaft 1 and through an insulating sleeve 39 in the lower end of this shaft. The conductor 38 terminates in a plug contact 40 which is engageable with a spring pressed contact 41 which is carried by the casing wall 20 and is accessible for engagement upon the exterior of the casing. The horn circuit also includes a metallic strap 42 which is disposed upon the interior of the casing and upon the interior face of the arcuate wall 20. The contact 41 is electrically connected with this strap as is also another spring pressed contact similar to contact 41, and which is engageable by a circuit terminal plug 43. The plugs 40 and 43 are receivable within plug receiving openings in the metallic blocks 44 and there engage the aforesaid spring pressed contacts that enter these openings. The other connecting plugs 40' enter into engagement with the exterior parts of contacts 15, 16, 17, 18 and 19, as illustrated. The circuits that are established are diagrammatically illustrated in Fig. 10 which illustrates the horn 37, the head lamps 45, the parking lamps 46, the tail lamp 48 and the grounded battery 47 which is included in circuit with these instrumentalities or excluded from circuit therewith according to the adjustments of the manually operable switching members pertaining thereto. The circuit control is clearly illustrated and it is believed that a further description thereof will not be essential. The switching mechanism is located above the common axis of the inclined steering column and steering shaft, the arcuate wall 20 of the casing for the switching mechanism being coaxial with said column and shaft. Access of foreign matter to the switching mechanism is then effectively guarded against.

The hollow steering shaft 28 is illustrated as enclosing other controlling shafts which do not enter into the present invention, a description thereof being, therefore, unnecessary.

Changes may be made without departing from the invention.

Having thus described my invention, I claim:

1. The combination with an inclined hollow steering column of an automotive vehicle; of switching mechanism assembled with the steering column at the lower end of said column and located upon the upper side of the column axis; a casing for the switching mechanism; a shaft passing through the steering column and having an operating lever at its upper end whereby this shaft may be turned, this shaft being in actuating relation with the switching mechanism; a push button upon the upper end of the shaft for governing the circuit of an electromagnetic horn, a portion of the horn circuit passing through the shaft; a conductor in the circuit of the horn passing through the casing; and a circuit connector included in the horn circuit and inclusive of two complemental contacts, one upon the end of the aforesaid conductor that is contiguous to and upon the exterior of said casing and the other mounted upon said casing.

2. The combination with a steering column of an automotive vehicle; of a shaft passing through said steering column and having an operating lever at the upper end whereby this shaft may be turned; switching mechanism including two complemental contacts one of these contacts being assembled with the steering column and the other being assembled with the shaft through the intermediation of a contact carrier extending radially from its shaft to a distance substantially greater than the diameter of the shaft; and a casing surrounding the shaft and the contact thereon this casing being assembled with the steering column and having an arcuate wall portion spaced from the shaft by substantially the length of the contact carrier and which is coaxial with the shaft, said wall portion carrying the other contact.

3. The combination with a steering column of an automotive vehicle; of a shaft passing through said steering column and having an operating lever at its upper end whereby this shaft may be turned; switching mechanism including a plurality of pairs of complemental contacts some of which are assembled with the steering column and the other contacts complementary to the first mentioned contact being assembled with the shaft; a casing for the aforesaid contacts and surrounding the shaft this casing having aligned bearings in opposite side walls thereof; a sleeve rotatable in said bearings and receiving the shaft which is fixed thereto; a block of insulation carrying the contacts that are upon the shaft; and a clip gripping said block of insulation and keyed upon said aforesaid sleeve.

4. In a switching mechanism, the combination with a rotatable member; of a U-shaped clip longitudinally disposed upon a radius of the axis of rotation of the member and embracing the member to be driven thereby; a block of insulation between the sides of the clip; a plurality of radially spring pressed contacts carried by the insulation and arranged longitudinally of the member; and a clamping screw passing through the sides of the clip and serving to clamp both the clip to the member and the insulation to the clip.

HARRY A. DOUGLAS.